United States Patent
Singh et al.

(10) Patent No.: US 11,012,289 B2
(45) Date of Patent: May 18, 2021

(54) REINFORCED MACHINE LEARNING TOOL FOR ANOMALY DETECTION

(71) Applicant: SAP SE, Walldorf (DE)

(72) Inventors: Amarendu Singh, Mirzapur (IN); Venkatesh Iyengar, Bangalore (IN); Abhradeep Kundu, Chandannagar (IN); Harish Kumar Sampangi Rama, Bangalore (IN); Sudhakar Bommenahalli Ramamurthy, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/507,899

(22) Filed: Jul. 10, 2019

(65) Prior Publication Data

US 2021/0014102 A1  Jan. 14, 2021

(51) Int. Cl.
*H04L 12/24* (2006.01)
*G06N 20/00* (2019.01)
*H04L 29/08* (2006.01)
*G06K 9/62* (2006.01)
*G06N 3/04* (2006.01)

(52) U.S. Cl.
CPC ............ *H04L 41/064* (2013.01); *G06K 9/628* (2013.01); *G06K 9/6223* (2013.01); *G06N 3/0454* (2013.01); *G06N 20/00* (2019.01); *H04L 67/025* (2013.01)

(58) Field of Classification Search
None
See application file for complete search history.

(56) References Cited

U.S. PATENT DOCUMENTS

| | | |
|---|---|---|
| 10,124,893 B1 * | 11/2018 | Aalund .................. B64C 39/024 |
| 10,613,962 B1 * | 4/2020 | Delange .............. G06F 11/0709 |
| 2012/0072781 A1 * | 3/2012 | Kini ....................... G06F 11/008 714/47.3 |
| 2018/0270347 A1 * | 9/2018 | Rangarajan ......... H04L 41/5067 |
| 2019/0052650 A1 * | 2/2019 | Hu ...................... H04L 63/1416 |
| 2019/0095313 A1 * | 3/2019 | Xu ........................ G06K 9/6282 |
| 2019/0325354 A1 * | 10/2019 | Rajnayak ............. G06K 9/6282 |
| 2020/0104200 A1 * | 4/2020 | Kocberber .............. G06F 17/18 |
| 2020/0125465 A1 * | 4/2020 | Choi ................... G06F 11/2263 |

* cited by examiner

*Primary Examiner* — Joshua Joo
(74) *Attorney, Agent, or Firm* — Mintz Levin Cohn Ferris Glovsky and Popeo, P.C.

(57) ABSTRACT

In some embodiments, there may be provided a system. The system may be configured to receive web server data indicating a current state of a web server; determine, by a machine learning model and based on the web server data, whether the web server is in a first failure state; generate a first failure state indication for the web server in response to the determination, by the machine learning model, that the web server is in the first failure state; determine, by a forecaster and based on the web server data, whether the web server is in a second failure state; and generate a second failure state indication for the web server in response to the determination, by the forecaster, that the web server is in the second failure state.

19 Claims, 9 Drawing Sheets

An anomaly has been detected on the following web servers. Please refer the table below for more details.

| # | Web server | Timestamp (in UTC) | Available memory (in percent) | # of connections | Dashboard link | Memory graph | Load graph |
|---|---|---|---|---|---|---|---|
| 1 | web42.snv.ariba.com 101A | 2018-09-20T20:05:00Z | 11.01 | 350.0 | link |  |  |
| 2 | web43.snv.ariba.com 101B | 2018-09-20T20:05:00Z | 1.01 | 350.0 | link |  |  |
| 3 | web44.snv.ariba.com 101C | 2018-09-20T20:05:00Z | 1.01 | 350.0 | link |  |  |

REINFORCED MACHINE LEARNING TOOL FOR ANOMALY DETECTION

TECHNICAL FIELD

The subject matter described herein relates generally to machine learning.

BACKGROUND

With the expansion of cloud-based applications including software-as-a-service (SAAS), the corresponding web servers in the cloud become increasingly important with respect to providing the promised software service. Often, one or more web servers coupled to the Internet may provide the services to remote client computers. These web servers may host one or more applications, and may host applications for different end-users (e.g., at different companies) or the same end-users (e.g., at the same company).

SUMMARY

Systems, methods, and articles of manufacture, including computer program products, are provided for detecting web server failures.

In some embodiments, there is provided a system. The system may include at least one data processor and at least one memory storing instructions which, when executed by the at least one data processor causes one or more of the following: receiving web server data indicating a current state of a web server; determining, by a machine learning model and based on the web server data, whether the web server is in a first failure state; generating a first failure state indication for the web server in response to the determining, by the machine learning model, that the web server is in the first failure state; determining, by a forecaster and based on the web server data, whether the web server is in a second failure state; generating a second failure state indication for the web server in response to the determining, by the forecaster, that the web server is in the second failure state; aggregating the first failure state and the second failure state to determine whether the web server is a failure state; and providing an alert when the aggregating determines the web server is in the failure state.

In some variations, one or more of the features disclosed herein including the following features can optionally be included in any feasible combination. The determining whether the web server is in the first failure state may include a first prediction of the first failure state, the determining whether the web server is in the second failure state may include a second prediction of the first failure state. The failure state may include a state of the web server. The state may include the web server being in failure or predicted to fail. The machine learning model may include a K-means classifier. The machine learning model may include a neural network, a recurrent neural network, and/or a long short-term memory artificial recurrent neural network. The web server data may indicate the current state comprises real-time data. The real-time data may include a central processing unit load information for the web server, a quantity of reads at the web server, a quantity of writes at the web server, a quantity of active threads at the web server, a quantity of connections, and/or a current amount of available memory at the web server. The forecaster may include a regression model configured to receive a quantity of connections at the web server and to output an estimate of an amount of available memory at the web server. When the estimated amount of available memory differs, by a threshold amount, from a current amount of available memory at the web server, the second failure state indication may be generated. The aggregating may include filtering and combining, wherein the filtering includes filtering one or more first failure state indications and one or more second failure state indications, and wherein the combining includes combining the filtered one or more first failure state indications and the filtered one or more second failure state indications. The forecaster may be trained based on historical information including past information indicating a quantity of connections at the web server and a corresponding available memory at the server. The machine learning model may be trained based on historical information including past information indicating a central processing unit load information for the web server, a quantity of reads at the web server, a quantity of writes at the web server, a quantity of active threads at the web server, a quantity of connections, and/or a current amount of available memory at the web server.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning based plug-in for accessing a cloud-based analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Predicting a failure of a web service may be a challenge given the differences in the loads and types of applications at each of the web servers. Predicting the failure may enable corrective action(s) before a more catastrophic failure affects the web server's ability to provide the SAAS to the end-user. As such, the overall availability of the web servers may be improved.

In some example embodiments, there is provided an anomaly detection system including two processing chains to detect whether a web server is in a failure state. As used herein, the failure state refers to a web server that is failing or predicted to fail. The anomaly detection system includes a include first processing chain that uses machine learning (ML) technology to detect, based on real-time data about a web server, whether the web server is in a failure state. The failure state may be characterized by a corrective action, such as a re-boot of the web server or some other type of corrective action. The second processing chain includes a forecaster that predicts, using a statistical technology (e.g., a regression model, a linear regression model, a logistic regression model, and/or the like) whether the web server is in a failure state. The outputs of the two processing chains are aggregated to yield an indication of whether the web server is in a failure state. For example, the anomaly detection system may predict whether the web server is in a failure state and, as such, makes a prediction of whether the web server is likely to fail. The aggregation reduces errors, such as false positives or true negatives, in detecting the failure state.

Figure 1:
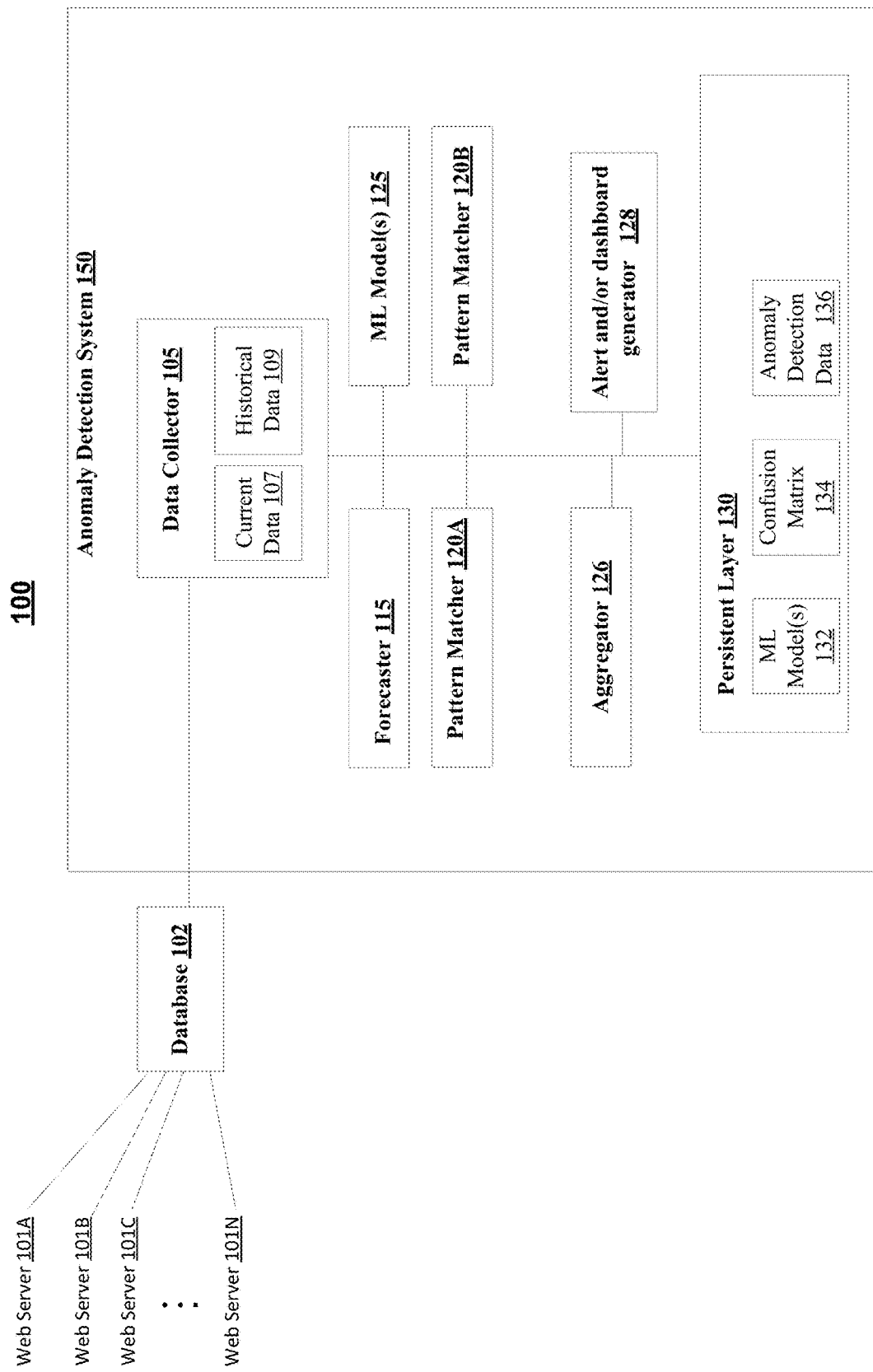
FIG. 1 depicts a system diagram of an anomaly detection system, in accordance with some example embodiments.

FIG. 1 depicts an example of a system 100, in accordance with some example embodiments. The system 100 may include an anomaly detection system 150. The anomaly detection system 150 may be configured to use an aggregation of machine learning technology and statistical technology to detect when a web server is in failure state, such as about to fail, failing, etc.

The anomaly detection system 150 may receive, from one or more databases such as database 102, data regarding one or more web servers 101A-N. This data may be collected in real time (e.g., from time to time over time) about each of the web servers. This time sequence data may be stored at database 102, and the time sequence data may, as noted, be indicative of the state and/or performance of each of the web servers. For each web server for example, the time sequence data may include one or more of the following: a quantity of connections being handled at the webserver; a central processing unit(s) CPU utilization (or load), a quantity of reads from memory, a quantity of writes to memory, a quantity of active threads, an available amount of memory, a quantity of input connections to a web server, a quantity of output connections from web server, and the like. The quantity of connections represents the quantity of users connected to a given web server at any given time.

The anomaly detection system 150 may include a data collector 105. The data collector may collect from database 102 the time sequence data, such as the current data 107 and historical data historical data 109) stored for each of the web servers 101A-N. The current data 107 may include time sequence data that is so-called "real-time" data about the one or more of the web servers For example, the current data may represent the current (e.g., within 30 seconds, 1 minute, 2 minutes, 3 minutes, 5 minutes, 10 minutes, and/or other relatively recent time) state of a corresponding web server. The current data 107 may be processed by the anomaly detection system to detect a current anomaly, such as a failure state, that may be used to predict whether a web server is likely in a failure state. The historical data 109 may be similar to the current data 107, but the historical data 109 represents stale or past data (when compared to the historical data 109) which may not necessarily represent the current state of each of the web servers. The historical data 109 may, however, be used to train and/or generate the models including machine learning models and models for the forecaster disclosed herein.

In some example embodiments, the anomaly detection system 150 may, as noted, include two processing chains to detect an anomaly, such as a failure state of a web server.

The first processing chain may include machine learning (ML) technology to detect anomalies in the current data 107 from each of the web servers 101A-N. For example, the first processing chain may include a ML model 125. The ML model may comprise a neural network, a recurrent neural network, a long short-term memory artificial recurrent neural network, a K-means classifier, and/or other types of machine learning technology to detect an anomaly in the current incoming data from each of the web servers 101A-N. Specifically, the ML model 125 may be trained (using for example historical data 109) to detect if the one or more web servers are in a failure state and thus predicted to fail. For example, if a web server 101A is about to fail, the time sequence data provided by the web server 101A to the database 102 (which is then provided to the data collector 105) may allow the machine learning model 125 to detect whether the web server 101A is about to fail or failing. To illustrate further, time sequence data, such as CPU utilization, quantity of reads from memory, quantity of writes to memory, quantity of active threads, available memory, and/or other data may be provided as an input to the ML model 125 (which has been trained to detect whether the web server associated with the time sequence data is about to fail). If a failure state is detected, the ML model may output a failure state indication for the corresponding web server. For example, the ML model may receive a plurality of inputs (which represent the state of a given web server) from the current data and generate an indication of the failure state for that web server.

The second processing chain may include statistical technology to detect anomalies in the current data 107 from each of the web servers 101A-N. For example, the second processing chain may include a forecaster 115. The forecaster 115 may include a statistical model, rather than a ML model, to detect if the one or more web servers are in a failure state and thus predicted to fail. For example, the current data 107, for a given web server, may be used by the forecaster 115 to detect whether a given web server is a failure state. For example, the forecasters' statistical model may comprise a logistical regression model, binary regression, and/or the like to detect an anomaly in the current incoming data from each of the web servers 101A-N. When linear regression or logistic regression is used as the forecaster, the forecaster's regression model may be generated based on prior, historical data to predict an output given an input. To illustrate further, the forecaster's statistical model may be trained (using for example historical data 109) to estimate, or forecast, available memory at a web server given an input of the web server's quantity of connections being handled. For example, a statistical model may be created for each web server using data obtain from each web server, when the web server is operating in a non-anomalous state. The collected data may be fed into a linear regression model, which determines a slope and the intercept for the statistical model. When trained, the slope and intercept may be used to output the current memory available at the web server based on an input of, for example, the web server's quantity of connections being handled.

When trained, the forecaster 115 may receive the time sequence data, such as the web server's quantity of connections being handled and the current memory available at the web server. Based on the quantity of connections for example, the forecaster determines as an output the estimated memory available at the web server. If the estimated amount of memory available at the web server differs from the web server's current memory available (which was received as part of the real-time data), the forecaster 115 may indicate a possible failure of the web server. For the current quantity of connections at a web server for example, if the web server's actual memory available (as indicated by the real-time data) is a threshold amount (e.g., 80% or other threshold value) less than the forecaster's estimated memory available at the web server, this represents a possible failure state of the web server. Unlike the ML model which may receive a plurality of inputs, the forecaster's model may thus take a single input, such as quantity of input connections being handled at a given web server, to generate an indication of a failure state for that web server.

The anomaly detection system 150 may include an aggregator 126. As noted, the ML model 125 and the forecaster 115 may each output an indication that a web server may be in a failure state (e.g., failing, about to fail, predicted to fail, etc.). In some example embodiments, the aggregator may combine the outputs of each of the ML model and the forecaster. This aggregation may be performed to reduce the quantity of false positives and/or true negatives, which may occur when compared to using only a single processing chain.

In some embodiments, one or more pattern matchers 120A-B may be used prior to aggregation by the aggregator 128.

For example, the pattern matcher 120B may receive, from ML model 125, an indication that a certain web server such as web server 101A is in a failure state. The pattern matcher may dampen (e.g., filter, average, etc.) the quantity of possible failure indications. For example, the current data 107 may be updated every 5 minutes, so the ML model 125 may output a failure state for the web server 101A every 5 minutes. However, this is likely the same failure state. As such, the pattern matcher may dampen out the repeated failure state indications, so that only a single failure state output for a given web server is provided to the aggregator 126 over a given time interval. For example, the pattern matcher 120B may be configured to provide only 1 failure state for a given web server 101A per half hour or other configurable time interval.

The pattern matcher 120A may receive, from the forecaster 115, an indication that a certain web server such as web server 101A is in a failure state. The pattern matcher 120A may perform the same or similar dampening as described with respect to pattern matcher 120B. In some example embodiments, the pattern matcher 120A may also compare, as noted above, the web server's actual memory available to the forecaster's 115 estimated memory available at the web server to determine whether there is possible failure state of a web server.

The anomaly detection system 150 may include an alert generator and/or dashboard generator 128. When a web server is identified as being in a possible failure state, the alert/dashboard generator 128 may generate an alert to indicate the failure state. For example, when the aggregator indicates a certain web server as being in a failure state, the aggregator 126 may provide that indication to the alert/dashboard generator 128. Next, the alert/dashboard generator 128 may collect from data collector 105 additional context information about the web server in the fail state. This context information may include identity of the web server and other data about the web server. The alert/dashboard generator 128 may then generate an alert, such as a message, email, text, and/or the like, to indicate the failure state of the web server. Alternatively or additionally, the alert/dashboard generator 128 may generate a dashboard for display at a user interface to indicate the failure state of the web server.

The anomaly detection system 150 may include a persistence layer 130, which further includes one or more ML models, a confusion matrix 134, and anomaly detection data 136. In some example embodiments, a plurality of ML models may be stored at 132. For example, each web server may have a corresponding ML model for use in the anomaly detector. When this is the case, the different ML models may be stored at 132. The confusion matrix 134 may be stored as well to provide an error matrix indicative of the performance of the forecaster 115 and/or ML model 125. The anomaly detection data 136 may include time of the anomaly, percentage of available memory, quantity of connection to or from the web server, web server's host name, and the like.

Figure 2A:
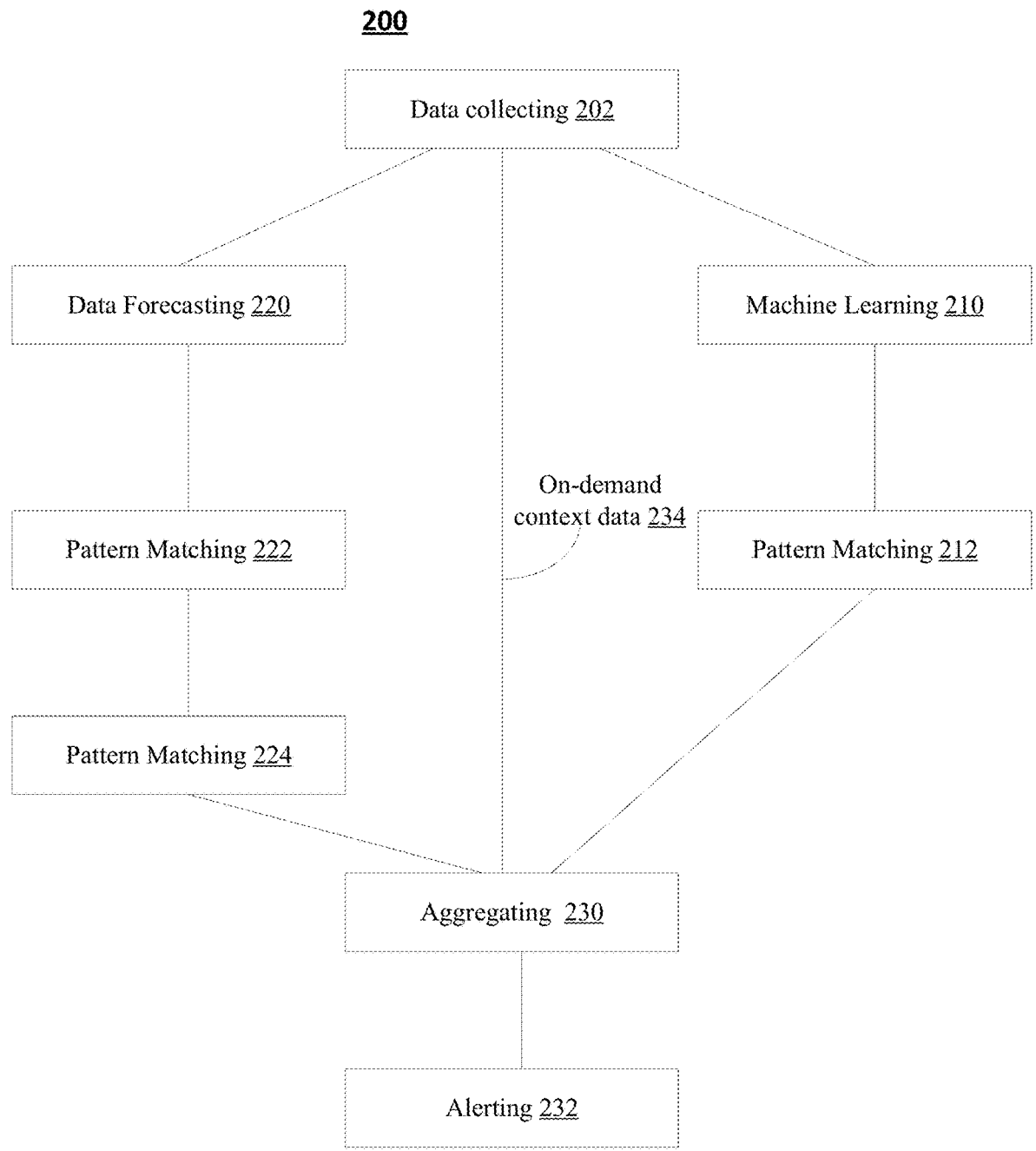
FIG. 2A depicts an example of a process flow for anomaly detection, in accordance with some example embodiments.

FIG. 2A depicts an example of a process 200 for detecting whether a web server is in a failure state, in accordance with some example embodiments. The description of FIG. 2A also refers to FIG. 1.

At 202, data may be collected. For example, the data collector 105 may collect data regarding the web servers. As noted, this data may include time sequence data (e.g., data collected at one or more times) regarding the state of the web servers 101A-N being monitored. This data may also be so-called "real-time data," as noted.

At 210, the trained machine learning model 125 may receive the time sequence data, such as current data 107, and determine whether this data indicates a possible anomalous condition such as a failure state of at least one of the web servers 101A-N. For example, the trained ML model may comprise a K-means classifier, although other types of ML technologies may be used as noted. When K means is used, the ML model may receive, for at least one of the web servers, the "real-time" time sequence data, such as current data 107. Examples of current data include one or more of the following: a CPU load, a quantity of reads from memory, a quantity of writes to memory, a quantity of active threads, an available memory, a quantity of input connections, a quantity output connection, and/or the like. Next, the ML model may then determine, based on the input of current data for a given web server, whether there is an anomaly, such as a failure state present at that web server. If there is a failure state, the ML model may output an indication that a given web server is in a failure state.

In the case of the ML model comprising a K means classifier, the historical data 109 may be used to train the ML model to determine clusters that are later used to classify the incoming data into either an anomalous cluster (e.g., likely a failure state at a web server) or a non-anomalous cluster (e.g., likely no failure state at a web server). This classification may use Euclidean distance to determine whether a given data set (e.g., one or more of the noted current data such as CPU load, etc.) should be part of a given cluster. In the instant example, there are two clusters, the anomalous cluster and the non-anomalous cluster.

In some embodiments, the ML model 125 may process current data 107 obtained from each web server 110A-N and determine whether there is a failure state for the corresponding web server. For example, ML model 125 may process current data obtained from web server 101A and then determine whether there is a likely failure state for the corresponding web server 101A; process current data obtained from web server 101B and then determine whether there is a failure state for the corresponding web server 101A; and so forth through the other web servers. In some example embodiments, each web server may have a corresponding ML model. For example, each ML model may be trained using historical data obtained from that specific web server. As such, the ML model for a given web server is specific to that web server. In some example embodiments, certain category or group of web servers, which are similarly configured, may share the same ML model. For example, a group of web servers having the same physical configuration and/or software application running on the applications may share an ML model trained using historical data obtained from that group of web servers.

At 212, the pattern matching may be performed on the output of the ML model. For example, the pattern matcher 120B may receive from the ML model 125 one or more failure state indications over time that a certain web server such as web server 101A (or other web server) is in a failure state. As such, the pattern matcher 120B may dampen the quantity of possible failure state indications, so that the single failure state for a given web server is not reported to the aggregator repeatedly as noted above. The failure state indication of a given web server may then be provided to the aggregator 126.

At 220, the forecaster 115 may perform data forecasting using a statistical technique such as linear regression or logistic regression. For example, the forecaster 115 may receive the time sequence data, such as the web server's quantity of connections being handled and the current memory available at the web server. Next, the forecaster may determine, based on the quantity of connections, an output that includes the estimated memory available at the web server. A change in the memory available may be a reliable indicator of an impending failure state of a web server.

At 222, the pattern matcher 120A may compare the estimated memory available at a web server (as determined by the data forecaster 115) to the current amount of memory available at the web server (as received from the data collector's 105 real-time time sequence data). If the estimate and current amounts differ by a threshold amount, the pattern matcher 120A outputs, at 222, a failure state indication for the corresponding web server. If the estimate and current amounts are within the threshold amount, the pattern matcher 120A outputs, at 222, a non-failure state indication for the corresponding web server. For example, if the estimated memory amount available at a web server is 90% and the current, actual amount of memory available is 50%, this may indicate that the current amount of memory available at the web server should be higher, so a possible failure state exists for that web server. If however, the estimated memory amount of is 90% of the web servers total and the current, actual amount of memory is 85%, this may indicate that the current amount of memory available at the web server is about right, so the web server may be operating in a non-failure state.

At 224, the pattern matcher 120A may receive the failure state indication provided by forecaster 115 and pattern matcher 120A and perform additional processing to reduce repeated failure state indications for the same web server. This may operate in the same or similar manner as noted with respect to 212.

At 230, the aggregator may aggregate the failure state indication provided by the ML learning 210 (and pattern matching 212) and the failure state indication provided by the data forecasting 220 (and pattern matching 222 and 224). For example, if both indications represent a non-failure state at a web server, the aggregation may output a normal state (e.g., non-failure) for the web server. If both indications are that there is failure state at a web server, the aggregation may output a failure state for the web server. However, if one of the indications indicates a failure state and the other indication indicates failure, the aggregation may output a normal state (e.g., non-failure) for the web server. Alternatively, if one of the indications indicates a failure state and the other indication indicates failure, the outputs of each may be weighted. For example, the failure indication provided from the forecaster 115 may be more heavily weighted (when compared to the ML model 125), so that if the forecaster indicates a failure state at a web server but the ML model indicates a normal, non-failure state for the same failure, the aggregator 126 may output, at 230, a failure state for the web server. Alternatively, the failure indication provided from the ML model 125 may be more heavily weighted (when compared to the forecaster 115), so that if the ML model indicates a failure state at a web server but the forecaster indicates a normal, non-failure state for the same failure, the aggregator 126 may output, at 230, a failure state for the web server.

At 230, the aggregator 126 may obtain additional context information for a web server that is in a failure state. For example, the additional context information about the web server may include identity of the web server and other data about the web server, such as historical available memory, application build version, historical number of connections to or from a web server, a list of changes from a prior build version, and/or the like.

At 232, the output of the aggregator 126 may be used to generate an alert or a dashboard to indicate to a user viewing the alert or dashboard of the failure state of a corresponding web server. This may enable a user or system to take corrective action, such as re-booting the web server, re-directing workload from the web server in the failure state to another web server, and/or the like.

Figure 2B:
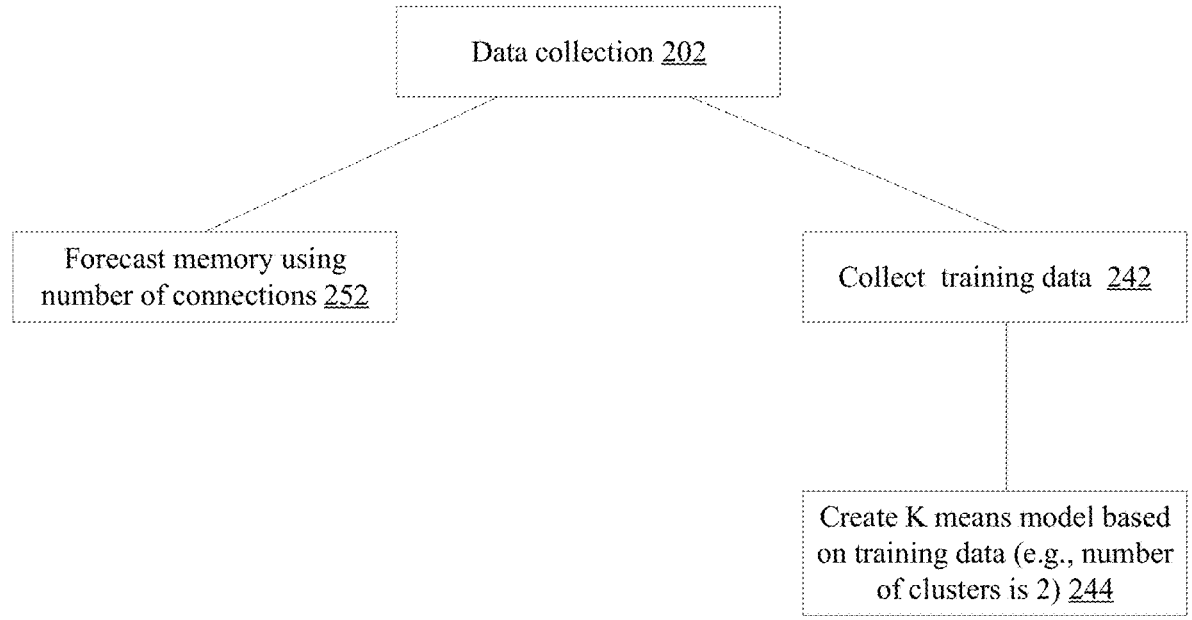
FIG. 2B depicts an example of training for anomaly detection, in accordance with some example embodiments.

FIG. 2B depicts an example process 299 for training the forecaster 115 and the ML model 125. The description of FIG. 2B also refers to FIG. 1.

At 242, the training data may be collected to enable training, at 244, of the ML model 125. For example, historical data 109 may include data about each of the web servers and whether each of the web servers subsequently entered into a failure state. For the web server 101A, the historical data may include at time t one or more of the following: a CPU load, a quantity of reads, a quantity of writes, a quantity of active threads, an available memory, a quantity of input connections, a quantity of output connections, and/or other data type features. This data may be provided as an input to the ML model. And for web server 101A, the historical data may also indicate that at t+1 (a later time) that the web server 101A failed, which is provided at the output of the ML model. In this example, the ML model may be trained with this data and other data for web server 101A to learn (or generate) the ML model's configuration for detecting whether server 101A will enter into a failure state. Once trained, the real-time, current data 107 may be input into the ML model, so it can generate a failure state indication for web server 101A, for example. Although the previous example listed specific types of data used as input features, this is merely an illustrative example as other types of data about the web server(s) may be used as well. Moreover, although the previous example describes the training as specific to each web server (so each web server has its own ML model), the ML model may be trained using data from a plurality of web servers 101A-N, in which case a single ML model may be used for all of the web servers 101A-N.

In the case of K means clustering as the ML model 125, the training data, such as the historical data noted at 242, may be used to form clusters. For example, a first cluster may be formed based on historical data indicative of a non-anomalous behavior of the web server, and a second cluster may be formed based on historical data indicative of an anomalous behavior of the web server. When the K-means model is generate or trained, the ML model (which in this example is a K-means clustering model) receives one or more inputs, such as CPU, memory availability, and/or the like from the current data 107, to generate a failure indication for a web server. For example, the Euclidean distance from the one or more inputs to each of the two clusters may be used to determine which cluster the input data set belongs too, such as the a first cluster (e.g., web server in a failure state) or a second cluster (e.g., web server in a non-failure state).

At 252, the forecaster 115 may, based on historical data 109, be trained to predict the output based on an input. In some example embodiments, a model, such as a regression model, a logistic regression model, and/or the like is used as the forecaster 115. When this is the case, a feature from the training data, such as the quantity of connection at the web server, may be used to predict available memory at the server. For example, the historical data 109 indicating number of web server connections and available memory over time may be collected for each web server. From this data collection, a linear or logistic regression model may be generated. At this point, the forecaster 115 (which is this example is a linear or logistic regression model) may receive an input from the current data 107, such as the number of connections for a given web server, to estimate what the available memory is for the given web server.

Figure 3A:
FIG. 3A depicts an example of training data which may be used to generate a forecaster model, in accordance with some example embodiments.
Figure 3A:
Figure 3A:
Figure 3A:
Figure 3A:
Figure 3A:

FIG. 3A depicts an example of training data which may be used to generate the forecaster's model as noted 252. For web server 101A, the available memory is 11.01 percent given 350 connections at that web server; for web server 101B the available memory is 1.01 percent given 350 connections at that web server; for web server 101C, the available memory is 11.01 percent given 350 connections at that web server. This as well as other data may be used at 252 to generate the model(s) for the forecaster 115.

Figure 3B:
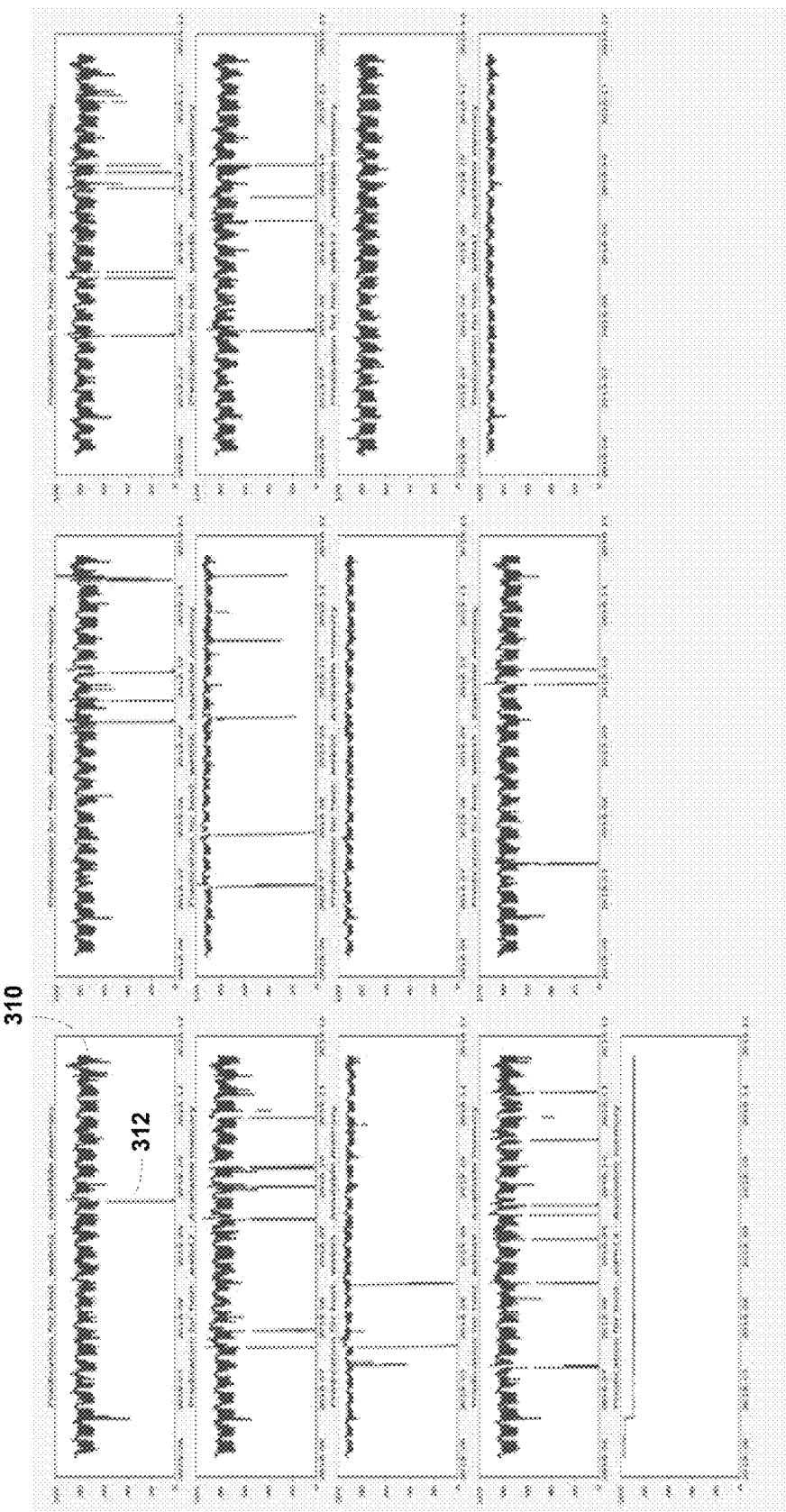
FIG. 3B depicts another example of training data which may be used to generate a forecaster model, in accordance with some example embodiments.

FIG. 3B depicts an example of training data that may be used for the forecaster training as noted at 252. In the example of FIG. 3B, the available memory percentage is shown on the y-axis over time on the x-axis. For example, the available memory over time is shown at 310, and 312 depicts an actual failure of the web server plotted.

Figure 3C:
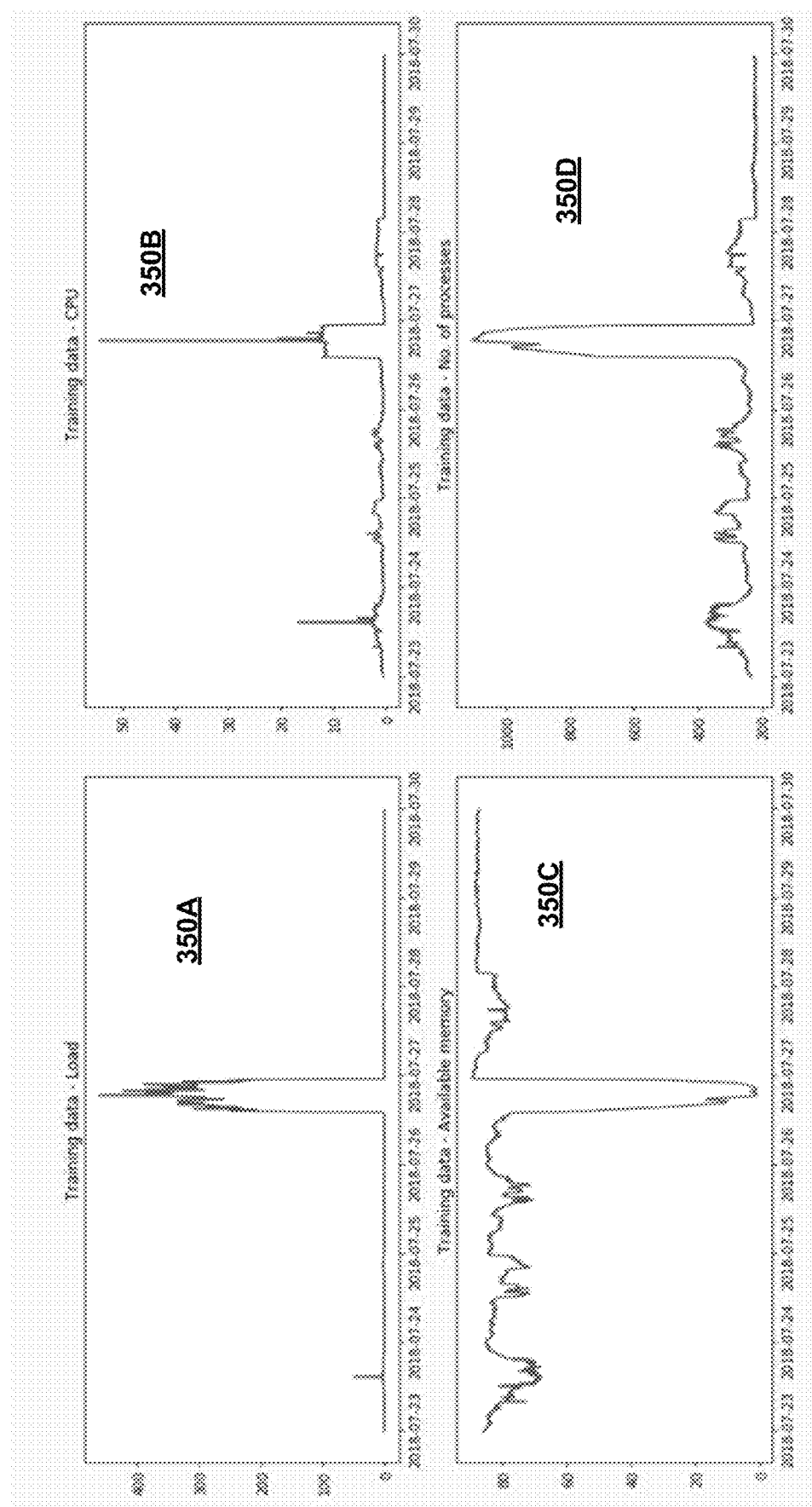
FIG. 3C depicts an example of machine learning model training data, in accordance with some example embodiments.

FIG. 3C depicts an example of ML model training data. For a given web server, the collected, historical data used for training includes web server load over time 350A, CPU utilization percentage over time 350B, available memory over time 350C, and quantity of processes active over time 350D.

Figure 3D:
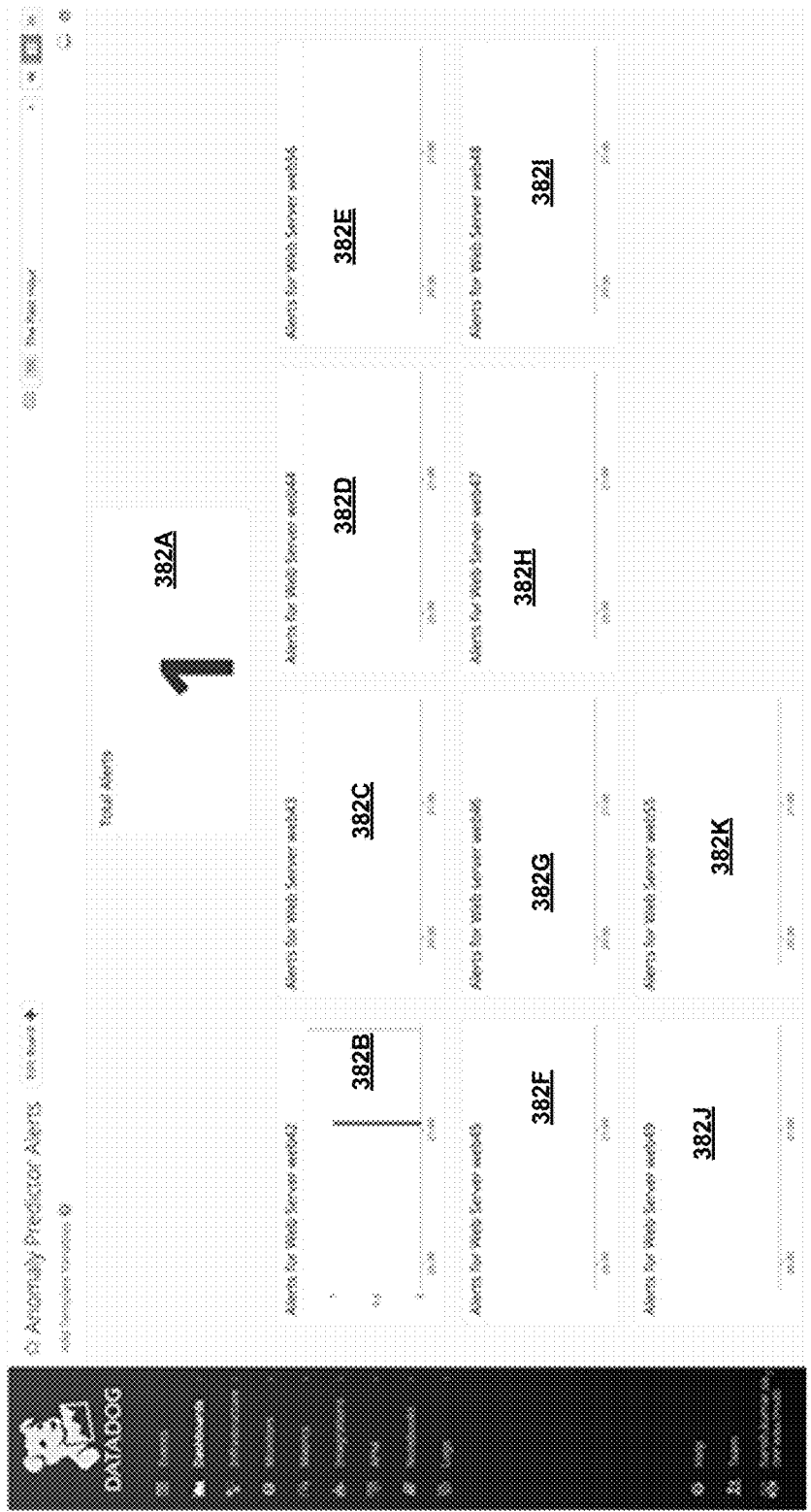
FIG. 3D depicts an example of a dashboard, in accordance with some example embodiments.

FIG. 3D depicts an example of a dashboard 380 generated by the alert/dashboard module 128. The dashboard 380 may include one or more views as follows: a list of total quantity of current alerts 382A such as failure states for a web servers; plots 382B-K showing the failure state over time of one or more of the web servers being monitored by the anomaly detection system. In the example of FIG. 3D, web server "web42" 382 has a failure state alert at a given time.

Figure 3E:
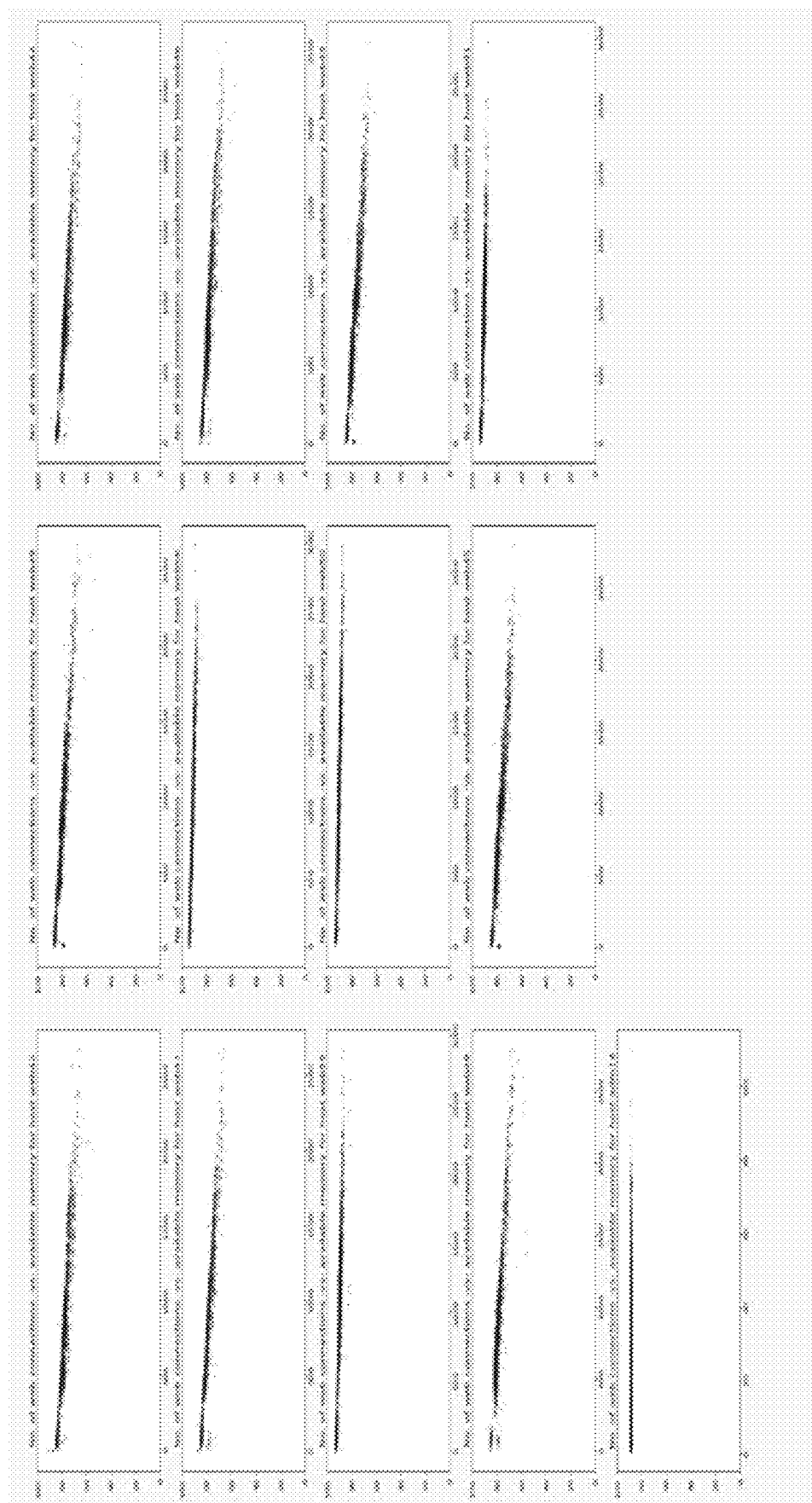
FIG. 3E depicts an example of the training data used to generate the regression model.

FIG. 3E depicts an example of the training data used to generate the regression model (e.g., a linear or logistic regression model) for the forecaster 115 as noted at 252. For each web server, the training data may include available memory percentage (as shown on the x-axis) for a given number of web connection (y-axis).

Figure 4:
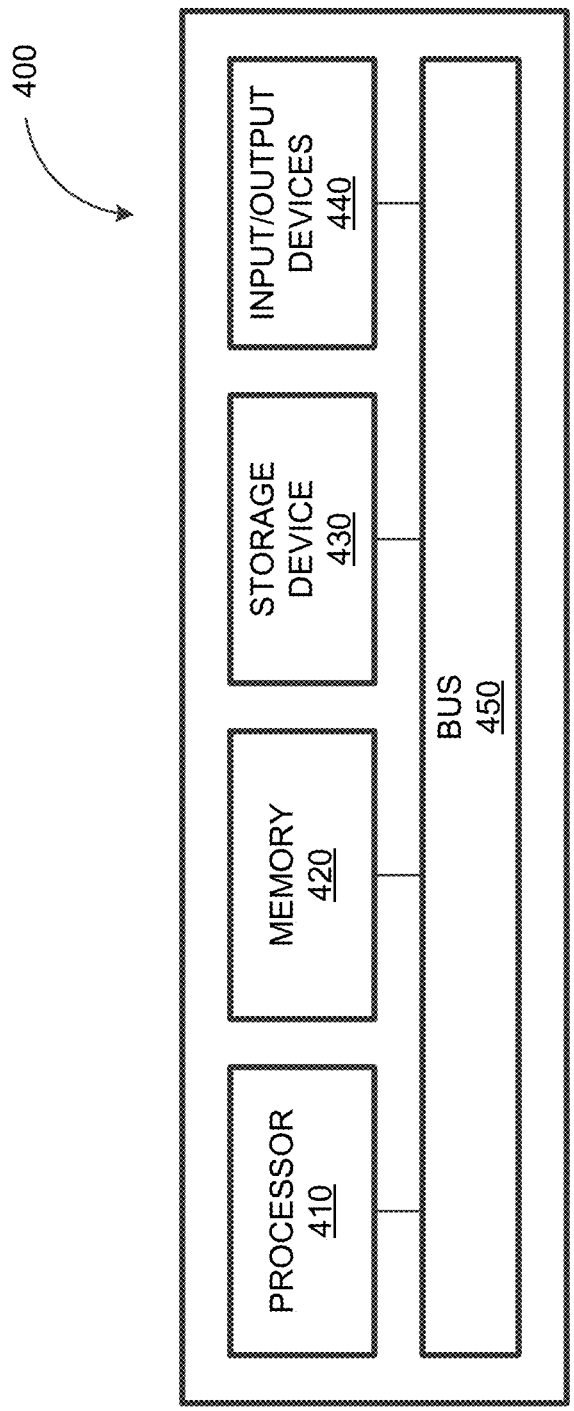
FIG. 4 depicts a block diagram illustrating a computing system, in accordance with some example embodiments.

FIG. 4 depicts a block diagram illustrating a computing system 400 consistent with implementations of the current subject matter. The computing system 500 can be used to implement the system 100 or one or more of the components therein such as the anomaly detection system.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the analytics engine 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, a tape device, a solid-state device, and/or any other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
receiving web server data indicating a current state of a web server;
determining, by a machine learning model and based on the web server data, whether the web server is in a first failure state;
generating a first failure state indication for the web server in response to the determining, by the machine learning model, that the web server is in the first failure state;
determining, by a forecaster and based on the web server data, whether the web server is in a second failure state, wherein the forecaster comprises a regression model configured to receive a quantity of connections at the web server and to output an estimate of an amount of available memory at the web server;
generating a second failure state indication for the web server in response to the determining, by the forecaster, that the web server is in the second failure state;
aggregating the first failure state and the second failure state to determine whether the web server is a failure state; and
providing an alert when the aggregating determines the web server is in the failure state.

2. The system of claim 1, wherein the determining whether the web server is in the first failure state comprises a first prediction of the first failure state; and wherein the determining whether the web server is in the second failure state comprises a second prediction of the first failure state.

3. The system of claim 1, wherein the failure state comprises a state of the web server, wherein the state comprises the web server being in failure or predicted to fail.

4. The system of claim 1, wherein the machine learning model comprises a K-means classifier.

5. The system of claim 1, wherein the machine learning model comprises a neural network, a recurrent neural network, and/or a long short-term memory artificial recurrent neural network.

6. The system of claim 1, wherein the web server data indicating the current state comprises real-time data.

7. The system of claim 6, wherein the real-time data includes central processing unit load information for the web server, a quantity of reads at the web server, a quantity of writes at the web server, a quantity of active threads at the web server, a quantity of connections, and/or a current amount of available memory at the web server.

8. The system of claim 1, wherein when the estimated amount of available memory differs, by a threshold amount, from a current amount of available memory at the web server, the second failure state indication is generated.

9. The system of claim 1, wherein the aggregating includes filtering and combining, wherein the filtering includes filtering one or more first failure state indications and one or more second failure state indications, and wherein the combining includes combining the filtered one or more first failure state indications and the filtered one or more second failure state indications.

10. The system of claim 1, wherein the forecaster is trained based on historical information including past information indicating a quantity of connections at the web server and a corresponding available memory at the server.

11. The system of claim 1, wherein the machine learning model is trained based on historical information including past information indicating a central processing unit load information for the web server, a quantity of reads at the web server, a quantity of writes at the web server, a quantity of active threads at the web server, a quantity of connections, and/or a current amount of available memory at the web server.

12. A method, comprising:
receiving web server data indicating a current state of a web server;
determining, by a machine learning model and based on the web server data, whether the web server is in a first failure state;
generating a first failure state indication for the web server in response to the determining, by the machine learning model, that the web server is in the first failure state;
determining, by a forecaster and based on the web server data, whether the web server is in a second failure state, wherein the forecaster comprises a regression model configured to receive a quantity of connections at the web server and to output an estimate of an amount of available memory at the web server;
generating a second failure state indication for the web server in response to the determining, by the forecaster, that the web server is in the second failure state;
aggregating the first failure state and the second failure state to determine whether the web server is a failure state; and
providing an alert when the aggregating determines the web server is in the failure state.

13. The method of claim 12, wherein the determining whether the web server is in the first failure state comprises a first prediction of the first failure state; and wherein the determining whether the web server is in the second failure state comprises a second prediction of the first failure state.

14. The method of claim 12, wherein the failure state comprises a state of the web server, wherein the state comprises the web server being in failure or predicted to fail.

15. The method of claim 12, wherein the machine learning model comprises a K-means classifier.

16. The method of claim 12, wherein the machine learning model comprises a neural network, a recurrent neural network, and/or a long short-term memory artificial recurrent neural network.

17. The method of claim 12, wherein the web server data indicating the current state comprises real-time data.

18. The method of claim 12, wherein the real-time data includes central processing unit load information for the web server, a quantity of reads at the web server, a quantity of writes at the web server, a quantity of active threads at the web server, a quantity of connections, and/or a current amount of available memory at the web server.

19. A non-transitory computer-readable storage medium including program code, which when executed by at least one data processor, causes operations comprising:
receiving web server data indicating a current state of a web server;
determining, by a machine learning model and based on the web server data, whether the web server is in a first failure state;
generating a first failure state indication for the web server in response to the determining, by the machine learning model, that the web server is in the first failure state;

determining, by a forecaster and based on the web server data, whether the web server is in a second failure state, wherein the forecaster comprises a regression model configured to receive a quantity of connections at the web server and to output an estimate of an amount of available memory at the web server;

generating a second failure state indication for the web server in response to the determining, by the forecaster, that the web server is in the second failure state;

aggregating the first failure state and the second failure state to determine whether the web server is a failure state; and providing an alert when the aggregating determines the web server is in the failure state.

* * * * *